US010230760B2

(12) United States Patent
Thakar et al.

(10) Patent No.: US 10,230,760 B2
(45) Date of Patent: Mar. 12, 2019

(54) REAL-TIME CLOUD-BASED DETECTION AND MITIGATION OF DNS DATA EXFILTRATION AND DNS TUNNELING

(71) Applicant: VERISIGN, INC., Reston, VA (US)

(72) Inventors: Sameer Thakar, Leesburg, VA (US); Nathan Glenn, Leesburg, VA (US)

(73) Assignee: VERISIGN, INC., Reston, VA (US)

( * ) Notice: Subject to any disclaimer, the term of this patent is extended or adjusted under 35 U.S.C. 154(b) by 130 days.

(21) Appl. No.: 15/333,120

(22) Filed: Oct. 24, 2016

(65) Prior Publication Data

US 2018/0115582 A1  Apr. 26, 2018

(51) Int. Cl.
| | |
|---|---|
| *G06F 11/00* | (2006.01) |
| *H04L 29/06* | (2006.01) |
| *H04L 12/46* | (2006.01) |
| *H04L 29/12* | (2006.01) |
| *H04L 29/08* | (2006.01) |

(52) U.S. Cl.
CPC ...... *H04L 63/1466* (2013.01); *H04L 63/1416* (2013.01); *H04L 12/4633* (2013.01); *H04L 61/1511* (2013.01); *H04L 67/10* (2013.01); *H04L 2463/144* (2013.01)

(58) Field of Classification Search
CPC . H04L 63/1466; H04L 63/1416; H04L 67/10; H04L 12/4633; H04L 61/1511
USPC ........................................................ 726/23
See application file for complete search history.

(56) References Cited

U.S. PATENT DOCUMENTS

| | | | |
|---|---|---|---|
| 2016/0065611 A1 | 3/2016 | Fakeri-Tabrizi et al. | |
| 2016/0099852 A1 | 4/2016 | Cook et al. | |
| 2016/0352772 A1* | 12/2016 | O'Connor | H04L 63/145 |
| 2017/0078321 A1* | 3/2017 | Maylor | H04L 63/1433 |

OTHER PUBLICATIONS

Greg Farnham, "Detecting DNS Tunneling", Sans Institute InfoSec, Reading Room, Feb. 25, 2013.
Extended European Search Report for Application No. 17197152.6 dated Mar. 15, 2018.

* cited by examiner

*Primary Examiner* — Mohammad W Reza
(74) *Attorney, Agent, or Firm* — Artegis Law Group, LLP (57) ABSTRACT

Various embodiments of the invention disclosed herein provide techniques for managing a domain name system (DNS) based attack. An exfiltration and tunneling mitigation platform receives a first DNS request directed to a first domain name. The exfiltration and tunneling mitigation platform determines that a first characteristic associated with a first fully qualified domain name (FQDN) included in the first DNS request exceeds a first threshold value. In response, the exfiltration and tunneling mitigation platform computes a distance between the first FQDN and a second FQDN included in a second DNS request also directed to the first domain name. The exfiltration and tunneling mitigation platform increments a first count value associated with the first domain name based on the distance. At least one advantage of the disclosed techniques is that a DNS-based attack can be detected and mitigated before a significant amount of DNS exfiltration or DNS tunneling has occurred.

20 Claims, 6 Drawing Sheets

REAL-TIME CLOUD-BASED DETECTION AND MITIGATION OF DNS DATA EXFILTRATION AND DNS TUNNELING

BACKGROUND OF THE INVENTION

Field of the Invention

The present invention relates generally to computer networks and, more specifically, to real-time cloud-based detection and mitigation of DNS data exfiltration and DNS tunneling.

Description of the Related Art

In the domain of computer networks, computing devices are often vulnerable to attack from malicious users via network-based messages. Typically, firewalls are implemented to protect computing devices that are connected to various networks from such malicious activities. Among other things, a firewall monitors and controls incoming and outgoing network messages on behalf of different computing devices connected to a network. The firewall commonly performs these monitoring and control operations by applying security rules or policies to the incoming and outgoing messages. As one example, if potentially malicious activity is detected on one or more of internet socket port numbers, then the firewall can block some or all of the incoming or outgoing messages on those internet socket port numbers. In effect, a firewall establishes a barrier or filter between computing devices within a trusted, secure internal network and machines within an oftentimes larger external network, such as the internet, that is presumed to be untrustworthy or unsecure.

One drawback of conventional firewalls is that traffic on certain internet socket port numbers cannot be blocked. For example, port number 53 is typically configured to handle all domain name system (DNS) related traffic, such as DNS requests and responses to such DNS requests. If certain network traffic on port 53 is blocked, then DNS-related services provided on port 53 may fail to work properly or may fail completely. Therefore, firewalls typically are required to keep port 53 open and are configured to forward all traffic transmitted or received on port 53 to ensure that DNS-related surfaces function properly. Because port 53 usually is left open, malicious users have employed DNS-based messages to attack target enterprise networks, knowing that most conventional firewalls are not set up to block DNS-based messages.

In one example, a computer system within a target enterprise network could become infected with a malicious software application that is configured to utilize port 53 to exfiltrate, or extract, sensitive data, such as social security numbers and credit card information, from that computer system and/or other computer systems within the target enterprise network. The malicious software application could gather data from the target enterprise network and encode the gathered data into one or more DNS requests transmitted over port 53. The DNS request could be formatted to transmit a request to a fully-qualified domain name (FQDN) of the form of label1.label2.label3.sld.tld, where "tld" is a top level domain (TLD), such as .com or .net, "sld" is a second level domain (SLD) registered to the malicious user, and "label1," "label2," and "label3" are fields that contain data gathered by the malicious software application and encoded into the DNS request. One or more DNS resolvers could then forward the DNS request to a malicious authoritative name server for resolution. The malicious authoritative name server could receive the DNS request, and decode the data within label1, label2, label3. Regardless of whether the malicious authoritative name server is configured to respond to the DNS request, the malicious authoritative name server would be in possession of the sensitive data that has been exfiltrated from the target enterprise network via the DNS request.

In another example, a computer system within a target enterprise network could become infected with a malicious software application that is configured to utilize port 53 to engage in DNS tunneling, or two-way communications, with a malicious authoritative name server. In such a situation, a malicious software application executing on an infected computer system could exfiltrate sensitive data within the target enterprise network via DNS requests, as described above. In addition, the malicious authoritative name server could respond to the DNS requests with one or more responsive DNS messages that include additional instructions for the malicious software application. For example, the responsive DNS messages could include a listing of computer systems, files, and/or types of data for the malicious software application to search. After searching the listed computer systems, files, and/or types of data, the malicious software application could then encode and transmit any findings to the malicious authoritative name server in subsequent DNS requests. Alternatively or in addition, the responsive DNS messages could include malicious payload data, such as executable code for the malicious software application to install and execute on one or more computer systems within the target enterprise network. The executable code could configure the one or more computer systems to find and transmit additional sensitive data to the malicious authoritative name server. The executable code could also configure the one or more computer systems to sabotage the target enterprise network by erasing or corrupting data residing within the target enterprise network, by reducing performance of one or more computer systems within the target enterprise network, or by directly controlling the functionality of one or more computer systems within the target enterprise network.

As the foregoing illustrates, what is needed in the art are techniques for detecting and mitigating DNS-based attacks directed towards computer networks.

SUMMARY OF THE INVENTION

Various embodiments of the present application set forth a method for managing a domain name system (DNS) based attack. The method includes receiving a first DNS request directed to a first domain name. The method further includes determining that a first characteristic associated with a first fully qualified domain name (FQDN) included in the first DNS request exceeds a first threshold value. The method further includes, in response, computing a distance between the first FQDN and a second FQDN included in a second DNS request also directed to the first domain name. The method further includes incrementing a first count value associated with the first domain name based on the distance. In some embodiments, the method further includes receiving a first DNS message in response to the first DNS request. In some embodiments, the method further includes determining that the first DNS message includes a resource record of a first type. In some embodiments, the method further includes, in response, incrementing a second count value associated with the first domain name.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that a DNS-based attack can be detected and mitigated before a significant amount of data has been exfiltrated or before a significant amount of DNS tunneling has occurred. As a result, target enterprise networks incur little or no data compromise and/or data loss relative to prior approaches. Another advantage of the disclosed techniques is that a DNS domain identified as being associated with a malicious user can be shared with multiple enterprise networks, such as enterprise networks that share the same exfiltration and tunneling mitigation platform. Once a DNS domain is thus identified, DNS requests directed to the DNS domain are blocked from multiple enterprise networks. As a result, further attacks by the malicious user on other enterprise networks may be prevented.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
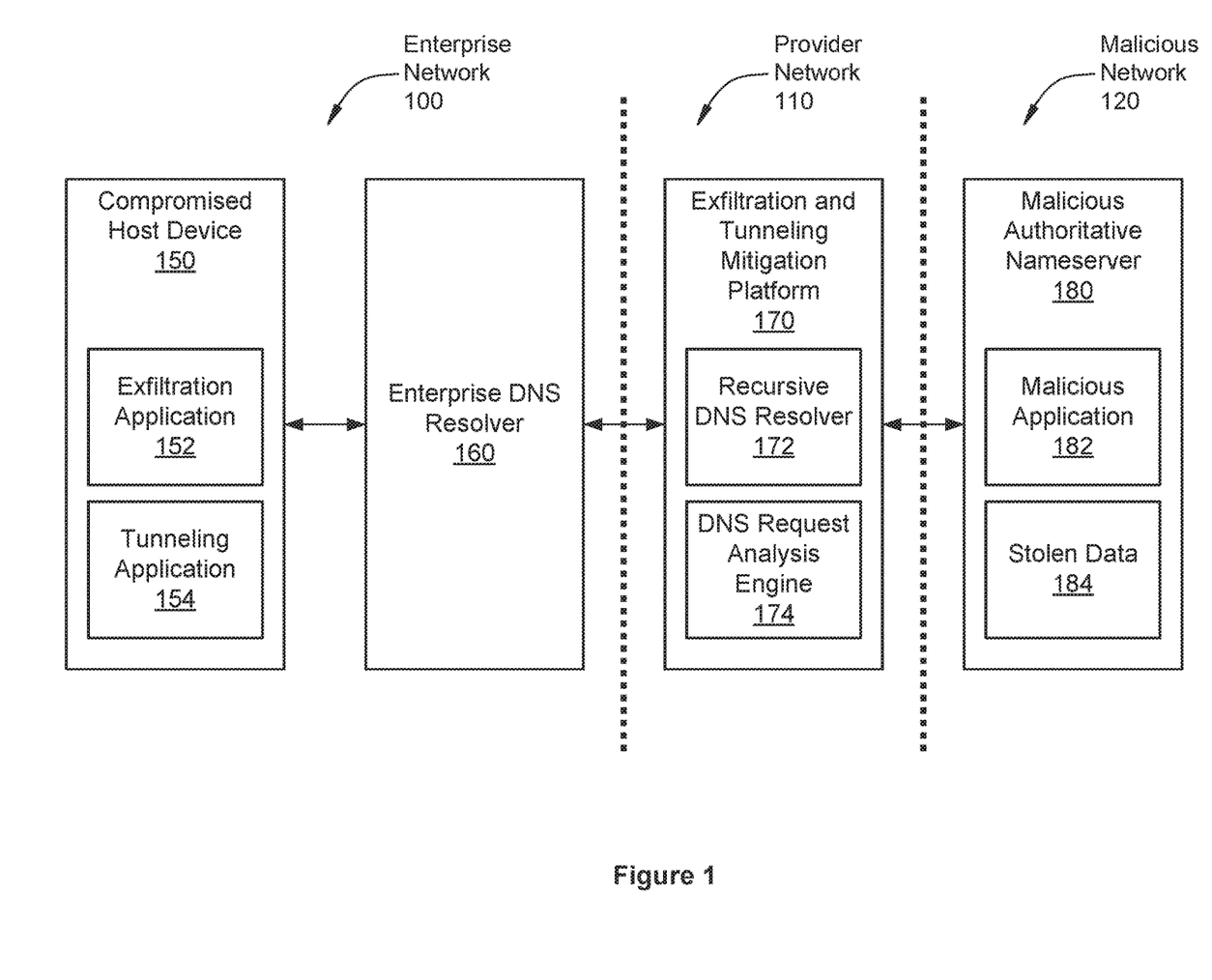
FIG. 1 illustrates a system configured to implement one or more aspects of the present invention.

FIG. 1 illustrates a system 100 configured to implement one or more aspects of the present invention. As shown, the system includes, without limitation, a compromised host device 150, an enterprise DNS resolver 160, an exfiltration and tunneling mitigation platform 170, and a malicious authoritative nameserver 180.

The compromised host device 150 and the enterprise DNS resolver 160 reside with an enterprise network 100. Likewise, the exfiltration and tunneling mitigation platform 170 and the malicious authoritative nameserver 180 reside within a provider network 110 and a malicious network 120, respectively. Each of the enterprise network 100, the provider network 110, and the malicious network 120 may be any suitable environment to enable communications among remote or local computer systems, including, without limitation, dedicated networks, LANs (Local Area Networks), and internet-based WANs (Wide Area Networks). The enterprise network 100, the provider network 110, and the malicious network 120 may communicate with one another via any technically feasible approach and may communicate via a common network, such as the internet.

The compromised host device 150 includes, without limitation, any type of computing device associated with an enterprise network 100. The computing device may include, without limitation, a personal computer, video game console, personal digital assistant, mobile phone, mobile device, or any other suitable computing device. The compromised host device includes one or both of an exfiltration application 152 and a tunneling application 154. In some embodiments, one or both of the exfiltration application 152 and the tunneling application 154 are configured to replicate themselves on other computing devices within the enterprise network 110.

The exfiltration application 152, when executing on the compromised host device 150, configures the compromised host device 150 to engage in DNS data exfiltration operations. The exfiltration application 152 may be installed on the compromised system inadvertently by visiting a malicious website that downloads the exfiltration application 152 to the compromised host device 150, by attaching a storage device that is infected with the exfiltration application 152 to the compromised host device 150, or other approaches employed by malicious users. Alternatively, the exfiltration application 152 may be purposely installed on the compromised system by a user within the enterprise network 100 engaging in corporate espionage or sabotage.

The exfiltration application 152 gathers data from the compromised host device 150 and/or other computing devices operating within the enterprise network 100. The exfiltration application 152 encodes the gathered data into one or more alphanumeric labels. The exfiltration application 152 generates DNS requests, where each DNS request includes one or more labels that include a portion of the encoded data.

Each DNS request appears to be standard DNS request directed to a hostname that is associated with a malicious user. In the context of internet communications, a hostname can include any one or more of the following components: (1) one or more host-specific labels; (2) a second level domain (SLD) name, such as a domain name registered with a service such as DNS; and (3) a top-level domain (TLD) such as .com, .net, or .edu. A hostname that includes all three of these components is typically referred to as a fully qualified domain name (FQDN). Additionally, the combination of the SLD and the TLD, such as bad_domain.com, is referred to herein as the domain name. In one example, the FQDN could be of the form label1.label2.label3.bad_domain.com, where label 1, label 2, and label 3 include the encoded data gathered by the exfiltration application 152, bad_domain is an SLD registered to a malicious user, and .com is the TLD. Correspondingly, the domain name for this FQDN is bad_domain.com. The exfiltration application 152 transmits one or more DNS requests with such a FQDN to the enterprise DNS resolver 160. In this manner, the exfiltration application 152 gathers sensitive data from within the enterprise network 100 and transmits the data to the malicious authoritative nameserver 180 via the enterprise DNS resolver 160 in the form of DNS requests.

The tunneling application 154, when executing on the compromised host device 150, configures the compromised host device 150 to engage in DNS tunneling operations. The tunneling application 154 may be installed on the compromised system inadvertently by visiting a malicious website that downloads the tunneling application 154 to the compromised host device 150, by attaching a storage device that is infected with the tunneling application 154 to the compromised host device 150, or other approaches employed by malicious users. Alternatively, the tunneling application 154 may be purposely installed on the compromised system by a user within the enterprise network 100 engaging in corporate espionage or sabotage.

As described in conjunction with the exfiltration application 152, the tunneling application 154 is configured to exfiltrate sensitive data from within the enterprise network 100 by gathering sensitive data from within the enterprise network 100 and transmitting the data to the malicious authoritative nameserver 180 via the enterprise DNS resolver 160 in the form of DNS requests.

In addition, the tunneling application 154 is configured to receive DNS messages, responsive to the DNS requests, from the malicious authoritative nameserver 180 via the enterprise DNS resolver 160. The responsive DNS messages include further information from the malicious authoritative nameserver 180. This further information is embedded within one or more fields of the responsive DNS message, such as a text field. The further information may include, without limitation, a list of computer systems, files, or types of data for the tunneling application 154 to search, executable code for the tunneling application 154 to install and execute on the compromised host device 150 or other computer systems within the enterprise network 100, and other malicious payload data. In response, the tunneling application 154 searches the listed computer systems, files, or types of data, installs executable code, and performs other operations as directed by the information included in the responsive DNS messages. The tunneling application 154 then encodes and transmits any findings to the malicious authoritative nameserver 180 via subsequent DNS requests. In this manner, the tunneling application 154 gathers sensitive data from within the enterprise network 100 and transmits the data to the malicious authoritative nameserver 180 via the enterprise DNS resolver 160 in the form of DNS requests. Further, the tunneling application 154 engages in two-way communication with the malicious authoritative nameserver 180, resulting in further possible data compromise, data loss, and other damage to one or more computing devices within the enterprise network 100.

Although the exfiltration application 152 and the tunneling application 154 are illustrated as separate applications within the compromised host device 150, the compromised host device 150, in some embodiments, may include a single malicious application configured to perform operations related to both DNS data exfiltration and DNS tunneling.

The enterprise DNS resolver 160 includes, without limitation, a computing device that may be a personal computer, router controller, server, mobile device, or any other device suitable for implementing one or more aspects of the present invention. The enterprise DNS resolver 160 receives DNS requests from computing devices within the enterprise network 100, such as compromised host device 150. The enterprise DNS resolver 160 translates the hostname within a DNS request to a network address, if the enterprise DNS resolver 160 is able to do so. A hostname is associated with a particular a computing device connected to a computer network, such as the internet. The hostname uniquely identifies the computing device to other devices within a given network. A names service, such as DNS, provides a mechanism for translating the hostname to a network address, such as an IP address, or vice versa. Various servers distributed throughout the network provide translations between hostnames and corresponding network addresses. Such servers are referred to herein as nameservers.

The process of translating the hostname to a network address, such as an IP address, is referred to herein as "resolving" the hostname to the network address. In general, the enterprise DNS resolver 160 is able to resolve DNS requests directed to hostnames that reside within the enterprise network 100 or hostnames that have been recently requested by a computing device within the enterprise network 100. If the enterprise DNS resolver 160 is not able to resolve the DNS request, the enterprise DNS resolver 160 forwards the DNS request to the exfiltration and tunneling mitigation platform 170 for resolution.

In particular, each DNS request transmitted by the exfiltration application 152 and the tunneling application 154 have different FQDNs because each DNS request includes different encoded data within the label field of the FQDN. Therefore, in general, the enterprise DNS resolver 160 is unable to resolve DNS requests transmitted by the exfiltration application 152 and the tunneling application 154. As a result, the enterprise DNS resolver 160 forwards these DNS requests to the exfiltration and tunneling mitigation platform 170 for resolution. In some embodiments, the system 100 may not include an enterprise DNS resolver 160. In such embodiments, the compromised host device 150 may communicate directly a recursive DNS resolver, such as the recursive DNS resolver 172 included in the exfiltration and tunneling mitigation platform 170. Typically, medium to large size enterprise networks may include an enterprise DNS resolver 160, while smaller size enterprise networks may not include such an enterprise DNS resolver 160.

The exfiltration and tunneling mitigation platform 170 includes, without limitation, a computing device that may be a personal computer, router controller, server, mobile device, or any other device suitable for implementing one or more aspects of the present invention. The exfiltration and tunneling mitigation platform 170 receives DNS requests from enterprise DNS resolver 160 that the enterprise DNS resolver 160 is unable to resolve. As shown, the exfiltration and tunneling mitigation platform 170 includes, without limitation, a recursive DNS resolver 172 and a DNS request analysis engine 174.

The recursive DNS resolver 172 is a DNS server that is configured to resolve any legitimate hostname to a corresponding IP address. The recursive DNS resolver 172 receives DNS requests and other DNS traffic from various devices, such as the enterprise DNS resolver 160 and the malicious authoritative nameserver 180, via one or more of the enterprise network 100, provider network 110, and malicious network 120. The DNS traffic includes network messages related to requests for content from various content sources one or more of these networks. The recursive DNS resolver 172 resolves these requests for content by determining the IP addresses for one or more sources of the requested content. The recursive DNS resolver 172 discovers and performs the needed routing to transfer content between content requestors and content sources. In some embodiments, the recursive DNS resolver 172 also monitors source IP addresses of the network messages in the DNS traffic to see if one or more firewall rules or policies are to be applied to the network messages.

In general, recursive DNS resolvers 172 are geographically dispersed, where each of a group of edge sites in different geographical locations is equipped with multiple recursive DNS resolvers 172. In one example, and without limitation, 15 to 20 edge sites are deployed in various geographical locations on the globe, where each edge is equipped with 10 to 20 recursive DNS resolvers 172. Such a deployment of recursive DNS resolvers 172 at geographically diverse edge site locations help to reduce the latency content requestors and content sources, regardless of where the content requestors are content sources are located.

The recursive DNS resolver 172 queries an authoritative nameserver, such as malicious authoritative nameserver 180, to resolve a hostname to an IP address. After resolving the hostname within a given DNS request to an IP address, the recursive DNS resolver 172 forwards the DNS request and the IP address to the DNS request analysis engine 174 for further processing.

As further described herein, the DNS request analysis engine 174 receives DNS requests from the recursive DNS resolver 172 and performs analysis to determine whether the DNS requests appear to be suspicious. If the DNS request does not appear to be suspicious, then the DNS request analysis engine 174 permits further DNS requests to be transmitted to the IP address associated with the hostname. If the DNS request does appear to be suspicious, then the DNS request analysis engine 174 logs data associated with the DNS request, as further described herein. If the number of suspicious DNS requests directed to a particular suspicious IP address exceeds a threshold value, then the DNS request analysis engine 174 prevents further DNS requests from being routed to the suspicious IP address. If the number of suspicious DNS requests directed to the particular suspicious IP address does not exceed the threshold value, then the DNS request analysis engine 174 permits further DNS requests to be transmitted to the IP address associated with the hostname.

In some embodiments, the exfiltration and tunneling mitigation platform 170 may be implemented as a cloud-based service, providing detection and mitigation of DNS-based attacks for multiple enterprise networks, such as enterprise network 100. In such embodiments, the exfiltration and tunneling mitigation platform 170 may determine that a suspicious domain name may be engaging in DNS exfiltration or DNS tunneling with respect to a particular enterprise network. In turn, the exfiltration and tunneling mitigation platform 170 may block DNS traffic between the suspicious domain name and one or more other enterprise networks, even if the suspicious domain name has not yet engaged in NS exfiltration or DNS tunneling with respect to the one or more other enterprise networks.

The malicious authoritative nameserver 180 receives DNS requests from the recursive DNS resolver 172 within the exfiltration and tunneling mitigation platform 170. In response, the malicious authoritative nameserver 180 resolves certain hostnames associated with the DNS requests to IP addresses. More specifically, the malicious authoritative nameserver 180 receives requests to resolve hostnames that are registered to or otherwise managed by the malicious authoritative nameserver 180. As further discussed herein, such DNS requests may be transmitted by the exfiltration application 152 and/or the tunneling application 154 executing on the compromised host device 150. Each of these DNS requests include one or more labels, where the labels include encoded sensitive data that has been exfiltrated one or more computing devices within the enterprise network 100, such as compromised host device 150. Malicious application 182, executing on the malicious authoritative nameserver 180, retrieves the labels from the DNS requests, decodes the labels to extract the sensitive data therein, and stores the sensitive data in a stolen data repository 184.

In the case of data exfiltration, the malicious application 182 may not transmit a DNS message in response to the DNS request. Alternatively, the malicious application 182 may transmit a dummy DNS message directed to the exfiltration application 152 in response to the DNS request, in order to appear to be a legitimate DNS nameserver. In the case of data tunneling, the malicious application 182 transmits a DNS message directed to the tunneling application 154 that includes further information embedded within one or more fields of the responsive DNS message, such as a text field. The further information may include, without limitation, a list of computer systems, files, or types of data for the tunneling application 154 to search, executable code for the tunneling application 154 to install and execute on the compromised host device 150 or other computer systems within the enterprise network 100, and other malicious payload data.

Detecting and Mitigating a DNS-Based Exfiltration or Tunneling Attack

Figure 2:
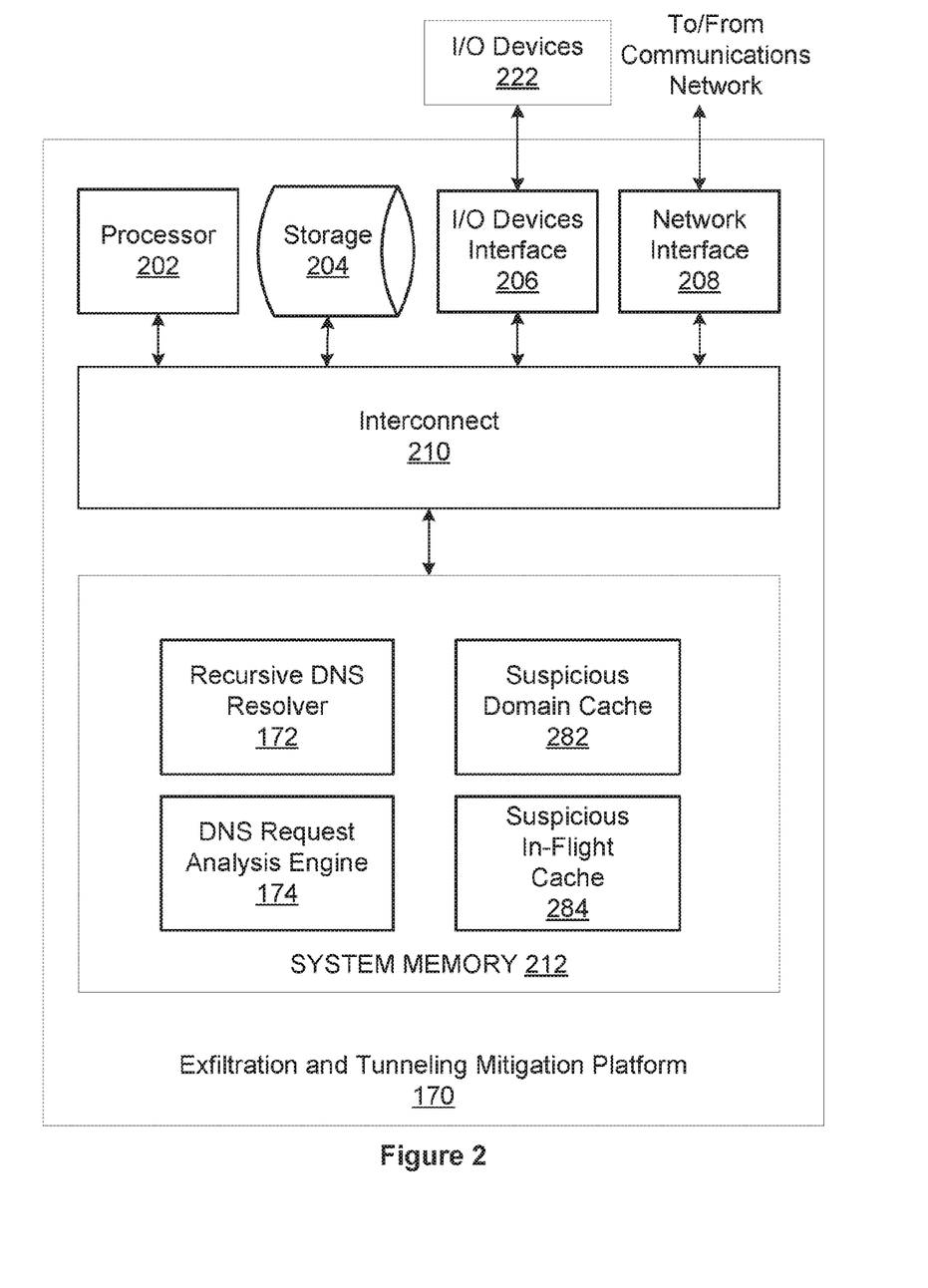
FIG. 2 is a more detailed illustration of the exfiltration and tunneling mitigation platform of FIG. 1, according to various embodiments of the present invention.

FIG. 2 is a more detailed illustration of the exfiltration and tunneling mitigation platform 170 of FIG. 1, according to various embodiments of the present invention. As shown, the exfiltration and tunneling mitigation platform 170 includes, without limitation, a central processing unit (CPU) 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a recursive DNS resolver 172, a DNS request analysis engine 174, a suspicious domain cache 282, and a suspicious in-flight cache 284. In some embodiments, the DNS request analysis engine 174, the suspicious domain cache 282, and the suspicious in-flight cache 284 may be encapsulated within the recursive DNS resolver 172.

As further discussed herein, the recursive DNS resolver 172 queries an authoritative nameserver, such as malicious authoritative nameserver 180, to resolve a hostname to an IP address. After resolving the hostname within a given DNS request to an IP address, the recursive DNS resolver 172 forwards the DNS request and the IP address to the DNS request analysis engine 174 for further processing.

The DNS request analysis engine 174 receives DNS requests from the recursive DNS resolver 172 and performs analysis to determine whether the DNS requests appear to be suspicious. If the DNS request does not appear to be suspicious, then the DNS request analysis engine 174 permits further DNS requests to be transmitted to the IP address associated with the hostname. If the DNS request does appear to be suspicious, then the DNS request analysis engine 174 logs data associated with the DNS request by initializing or updating an entry in the suspicious domain cache 282. The entry in the suspicious domain cache 282 includes various fields associated with the DNS request, including, without limitation, the IP address, the last DNS request directed to the IP address, a message identifier, and a count of the number of suspicious DNS requests directed to the IP address. If the number of suspicious DNS requests directed to a particular suspicious IP address exceeds a threshold value, then the DNS request analysis engine 174 prevents further DNS requests from being routed to the suspicious IP address. If the number of suspicious DNS requests directed to the particular suspicious IP address does not exceed the threshold value, then the DNS request analysis engine 174 permits further DNS requests to be transmitted to the IP address associated with the hostname.

In addition, the DNS request analysis engine 174 stores an entry in the suspicious in-flight cache 284 for each DNS request directed to a suspicious domain that is permitted to be forwarded. When a responsive DNS message corresponding to an entry in the suspicious in-flight cache 284 is received, the DNS request analysis engine 174 analyzes the responsive DNS message for certain suspicious characteristics, such as large amounts of data in a text field. The DNS request analysis engine 174 logs information for such suspicious responsive DNS messages and, if the number of suspicious DNS messages for a particular IP addresses exceeds a threshold value, then the DNS request analysis engine 174 prevents further DNS requests from being routed to the suspicious IP address.

The DNS request analysis engine 174, suspicious domain cache 282, and suspicious in-flight cache 284 are now described in further detail.

Figure 3:
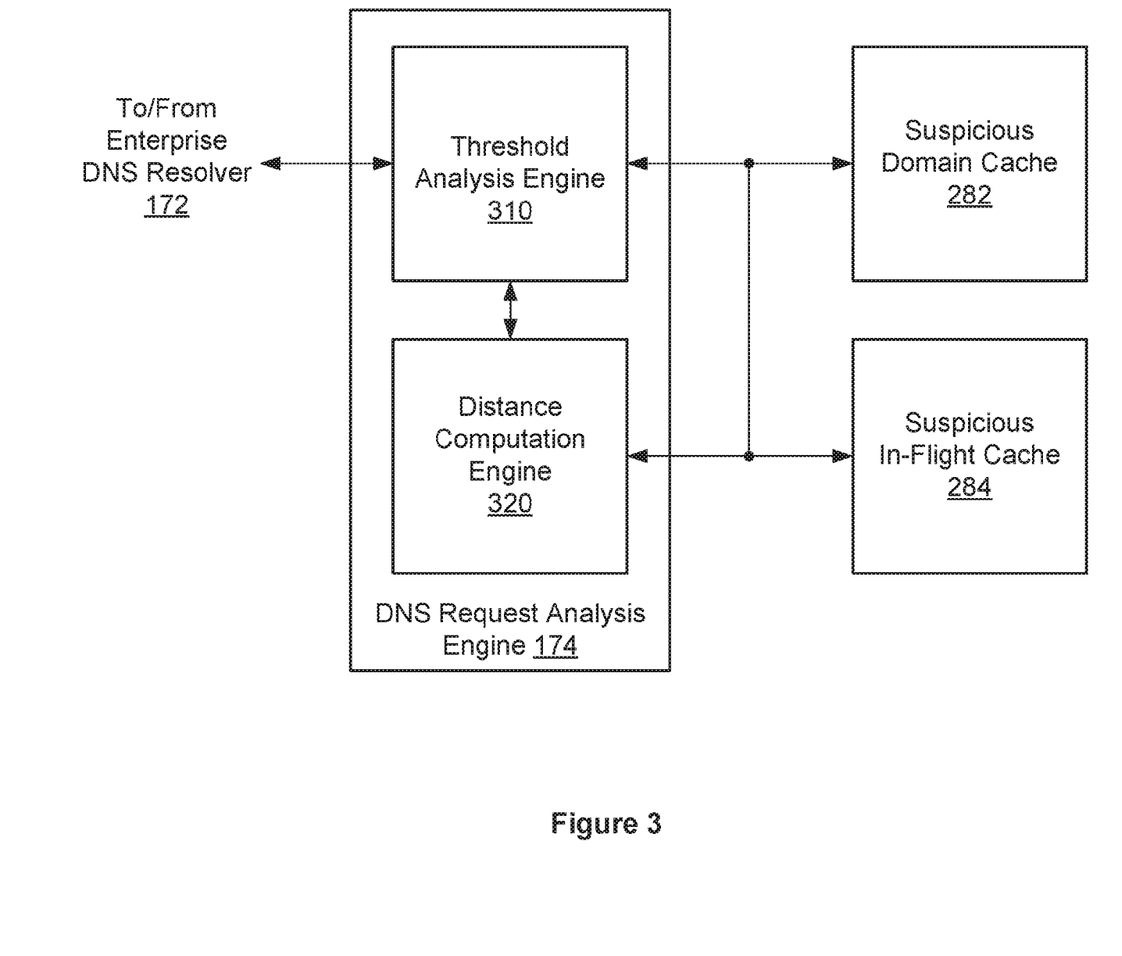
FIG. 3 is a more detailed illustration of the DNS request analysis engine of FIG. 1, according to various embodiments of the present invention.

FIG. 3 is a more detailed illustration of the DNS request analysis engine 174 of FIG. 1, according to various embodiments of the present invention. As shown, the DNS request analysis engine 174 includes, without limitation, a threshold analysis engine 310 and a distance computation engine 320. Additional details of the suspicious domain cache 282 and the suspicious in-flight cache 284 of FIG. 2 are also shown in FIG. 3.

As described herein, the DNS request analysis engine 174 includes a recursive DNS resolver 172 that resolves a hostname associated with a DNS request to a network address, such as an IP address. The recursive DNS resolver 172 then transmits the DNS request and the IP address to the DNS request analysis engine 174.

The threshold analysis engine 310 compares certain characteristics of the DNS request against corresponding thresholds. More specifically, the DNS request analysis engine 174 compares the total length of the FQDN against a FQDN length threshold. A FQDN can be as long as 256 characters. As a practical matter, legitimate FQDNs are generally much shorter in length. A long FQDN is indicative of a DNS request that includes encoded data within the FQDN. Additionally, the DNS request analysis engine 174 compares the number of labels included in the FQDN against a label quantity threshold. A FQDN can include multiple labels prepended to the SLD and TLD combination. As a practical matter, a legitimate FQDN generally includes one or two labels. A large number of labels is indicative of a DNS request that includes encoded data within the FQDN labels. Further, the DNS request analysis engine 174 compares the length of the labels against a label length threshold. Labels can be either short or long, so long as the total length of the FQDN does not exceed 256 characters. As a practical matter, legitimate labels are relatively short in length. If any one, two or all three of the thresholds are exceeded, the DNS request is considered suspicious.

In some embodiments, the threshold analysis engine 310 may analyze certain additional characteristics of the DNS request. More specifically, the DNS request analysis engine 174 may identify the age of the destination domain specified by the hostname within the DNS request. The DNS request analysis engine 174 may identify the age of the destination via any technically feasible approach, such as querying a registration database that includes registration information related to the destination domain or performing a "whois" domain lookup to retrieve registration information related to the destination domain. A domain that has been registered relatively recently, thereby having a young age, may be indicative of a domain associated with a malicious user. Further, the DNS request analysis engine 174 may analyze the characteristics of the domain specified by the current DNS request against other domains that have been marked as suspicious. In one example, and without limitation, a domain that shares characteristics with other suspicious domains, such as employing the same authoritative nameserver, may be indicative of a domain associated with a malicious user.

Based on results from these threshold comparison and additional analysis, the threshold analysis engine 310 determines whether or not a given DNS request is considered suspicious. If a DNS request is considered suspicious, the threshold analysis engine 310 searches the suspicious domain cache 282 for an entry corresponding to the domain name associated with the DNS request. If the suspicious domain cache 282 does not include such an entry, then the threshold analysis engine 310 creates an entry that includes, without limitation, the suspicious domain name, the DNS request itself including the FQDN, and the IP address corresponding to the domain name. Further, the DNS request analysis engine 174 initializes a count field in the new cache entry to 1, indicating that no DNS requests associated with the suspicious domain name were previously detected.

The new cache entry also includes fields for counts of relevant resource records for the purpose of tracking DNS tunneling via DNS messages sent in response to DNS requests. These fields are initialized to 0. Certain resource records, if included in DNS message sent in response to a DNS request, are indicative of possible DNS tunneling. Such resource records include, without limitation CNAME, MX, and TXT resource records. A CNAME record specifies redirects from a domain's subdomains to other domains or subdomains. An MX record specifies where email for the domain should be delivered. A TXT record includes text material for delivery to the originator of the DNS request. The fields for counts of relevant resource records maintain counts of CNAME, MX, and TXT, respectively, received from suspicious domain names. Each entry in the suspicious domain cache 282 may also include a record of the recent DNS traffic associated with the suspicious DNS domain. For example, and without limitation, each entry in the suspicious domain cache 282 could include the most recent ten seconds of DNS traffic associated with the suspicious DNS domain associated with the entry.

In addition, the threshold analysis engine 310 creates an entry in the suspicious in-flight cache 284 that includes the DNS request along with a message identifier that uniquely identifies the DNS request. If and when a DNS message is received in response to the DNS request, the threshold analysis engine 310 analyzes the responsive DNS message for indications of DNS tunneling. More specifically, the threshold analysis engine 310 analyzes the responsive DNS message for the presence of certain resource records which, if included in the responsive DNS message, are indicative of possible DNS tunneling. Such resource records include, without limitation CNAME, MX, and TXT resource records. If any one or more of the relevant resource records are included in the responsive DNS message, the threshold analysis engine 310 increments the corresponding resource record counts of the entry in the suspicious domain cache 282 that is associated with the suspicious domain. If any one or more of the resource record counts exceeds a corresponding count threshold, then the threshold analysis engine 310 identifies the suspicious domain as potentially engaging in DNS tunneling. The DNS request analysis engine 174 blocks further DNS traffic with the suspicious domain.

If the suspicious domain cache 282 does include an entry corresponding to the domain name associated with the DNS request, then the threshold analysis engine 310 transmits the suspicious DNS request to the distance computation engine 320.

The distance computation engine 320 computes a distance between the FQDN included in the current DNS request and the FQDN included in the last DNS request directed to the same domain name, as recorded in the entry of the suspicious domain cache 282. The distance computation engine 320 computes the distance via any technically feasible approach. The distance can be any technically feasible measure of the difference between two FQDNs, including, without limitation, a string distance. If the computed distance is large, then the FQDN included in the current DNS request is significantly different from the FQDN included in the last DNS request directed to the same domain name. Successive DNS requests to a given domain name, but with significantly different FQDNs, are indicative of a malicious DNS request. This is because DNS requests that include exfiltrated data typically include prepended labels that are very different from one DNS request to the next DNS request, resulting in a large distance computation. If, on the other hand, the computed distance is small, then the FQDN included in the current DNS request is relatively similar to the FQDN included in the last DNS request directed to the same domain name. Successive DNS requests to the same or similar FQDNs for a given domain name is indicative of legitimate DNS requests.

If the distance computation exceeds a distance threshold, then the distance computation engine 320 increments the count in the corresponding entry of the suspicious domain cache 282. If the count in the entry exceeds a count threshold, then the distance computation engine 320 identifies the suspicious domain as potentially engaging in DNS exfiltration. The DNS request analysis engine 174 blocks further DNS traffic with the suspicious domain.

It will be appreciated that the system shown herein is illustrative and that variations and modifications are possible. In one example, and without limitation, although the network addresses are described herein as IP addresses, any suitable network address may be employed within the scope of the disclosure. Further, the present disclosure describes implementations of detecting and mitigating DNS exfiltration and DNS tunneling via an exfiltration and tunneling mitigation platform that includes a recursive DNS resolver and a DNS request analysis engine. However, other implementations are possible within the scope of this disclosure. In one example, and without limitation, aspects of the present disclosure could be implemented on one or more other systems alternative to or in addition to the exfiltration and tunneling mitigation platform. One such system could be, without limitation, the enterprise DNS resolver for a compromised host device or other suitable system that resides within the enterprise network. In such cases, aspects of the present disclosure could be provided via an on-premises system alternative to or in addition to a cloud-based service accessed via the exfiltration and tunneling mitigation platform.

Figure 4A:
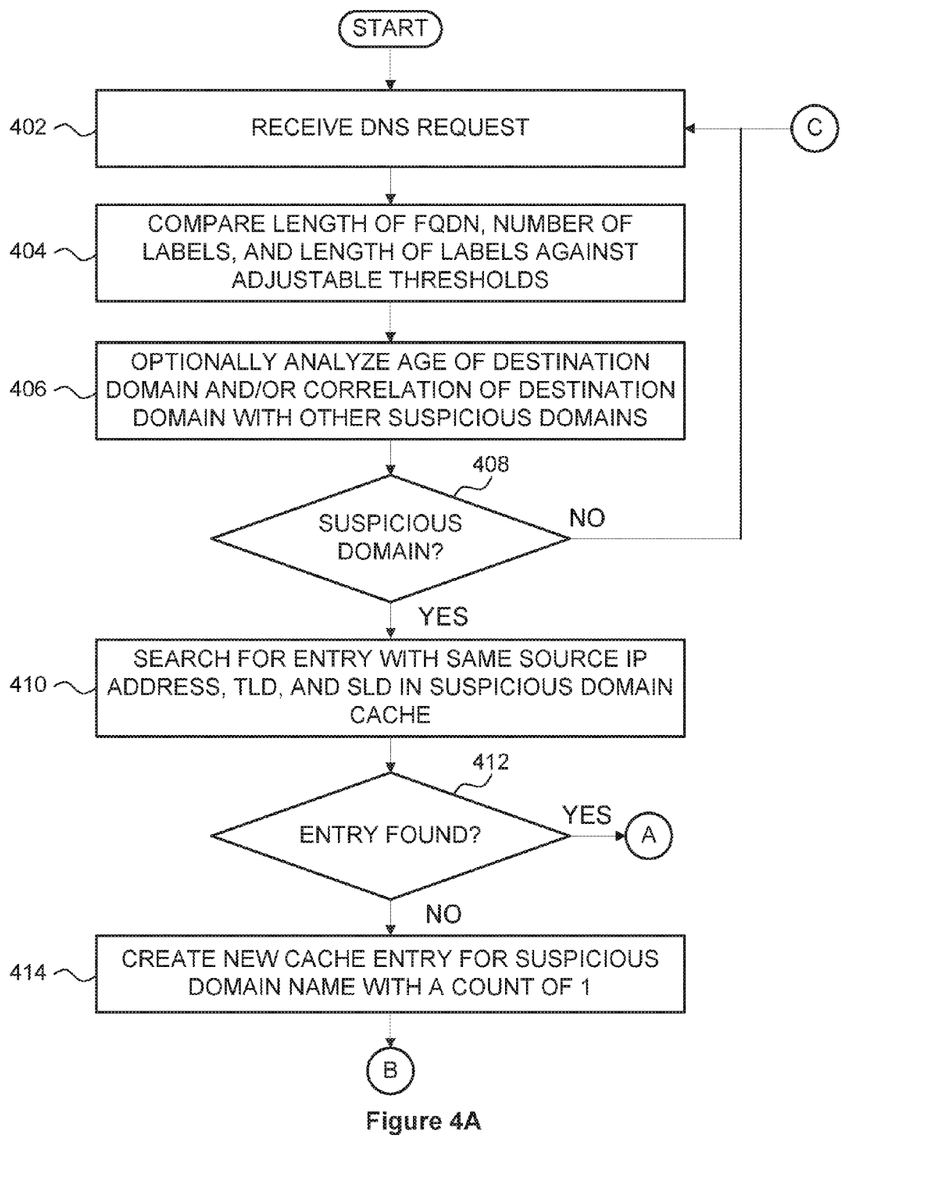
FIGS. 4A-4C set forth a flow diagram of method steps for detecting and mitigating a domain name system (DNS) based attack, according to various embodiments of the present invention.
Figure 4B:
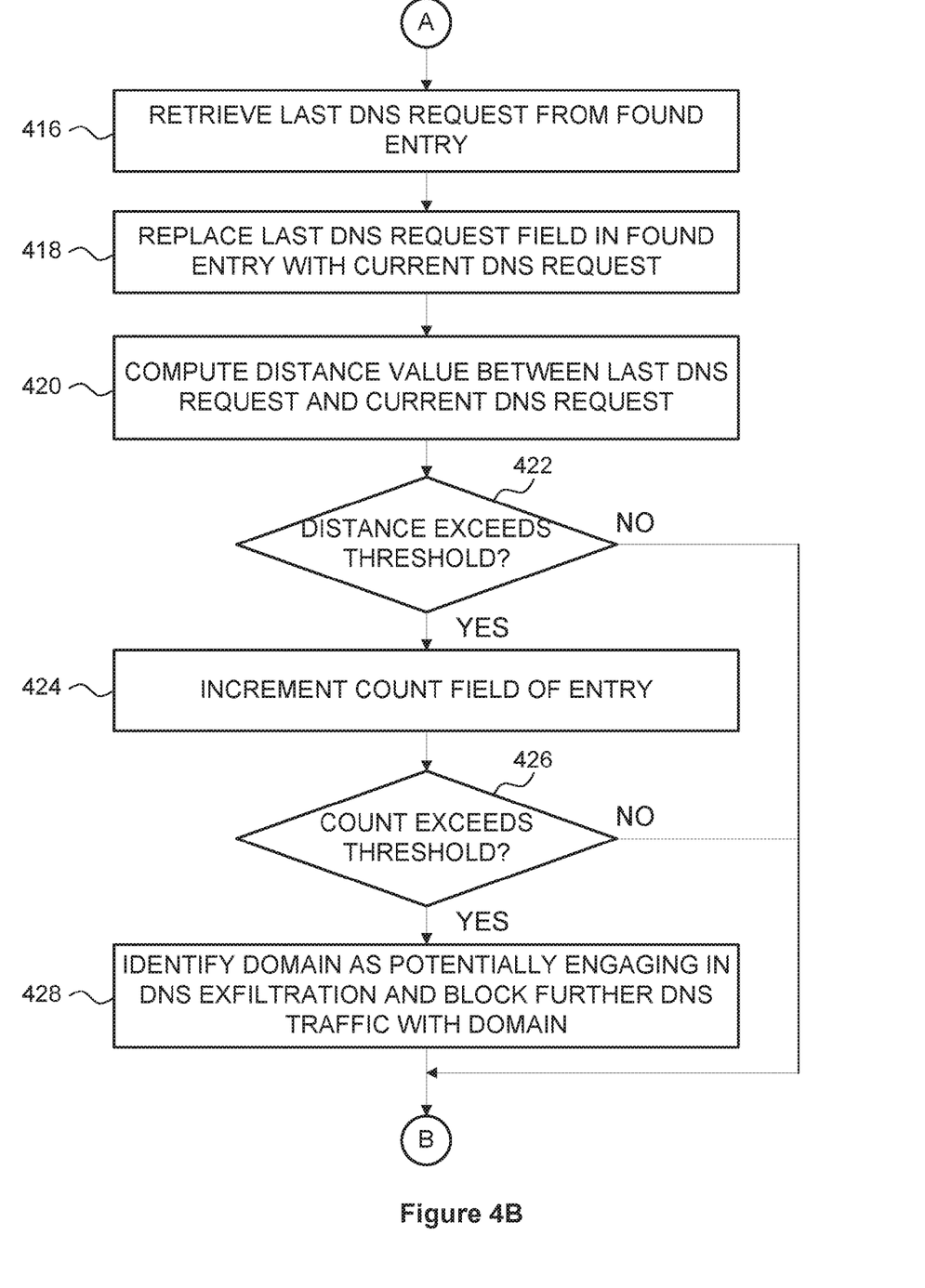
Figure 4C:
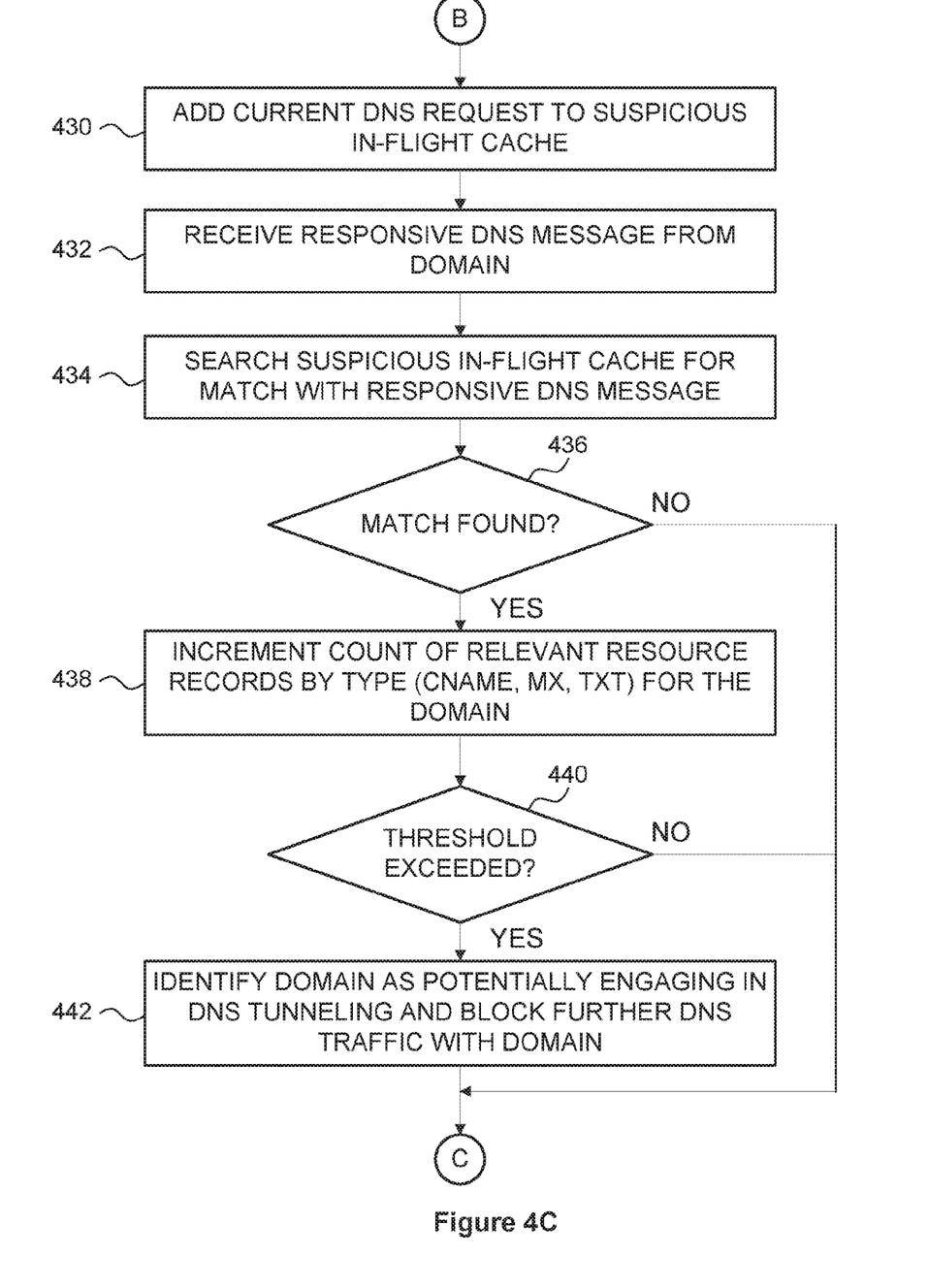

FIGS. 4A-4C set forth a flow diagram of method steps for managing a domain name system (DNS) based attack, according to various embodiments of the present invention. Although the method steps are described in conjunction with the systems of FIGS. 1-3, persons of ordinary skill in the art will understand that any system configured to perform the method steps, in any order, is within the scope of the present invention.

As shown, a method 400 begins at step 402, where a DNS request analysis engine executing on an exfiltration and tunneling mitigation platform receives a DNS request. The DNS request analysis engine receives the DNS request from a client device, such as a compromised host device. The DNS request analysis engine receives the DNS request via one or more resolvers, such as an enterprise DNS resolver or a recursive DNS resolver.

At step 404, the DNS request analysis engine compares certain characteristics of the DNS request against corresponding thresholds. More specifically, the DNS request analysis engine compares the total length of the FQDN against a FQDN length threshold. A FQDN can be as long as 256 characters. As a practical matter, legitimate FQDNs are generally much shorter in length. A long FQDN is indicative of a DNS request that includes encoded data within the FQDN. Additionally, the DNS request analysis engine compares the number of labels included in the FQDN against a label quantity threshold. A FQDN can include multiple labels prepended to the SLD and TLD combination. As a practical matter, a legitimate FQDN generally includes one or two labels. A large number of labels is indicative of a DNS request that includes encoded data within the FQDN labels. Further, the DNS request analysis engine compares the length of the labels against a label length threshold. Labels can be either short or long, so long as the total length of the FQDN does not exceed 256 characters. As a practical matter, legitimate labels are relatively short in length. If any one or more of the thresholds are exceeded, the DNS request is considered suspicious.

In some embodiments, the DNS request may be considered suspicious only if any two of the thresholds are exceeded. In some embodiments, the DNS request may be considered suspicious only if all three of the thresholds are exceeded. In some embodiments, the thresholds may be adjustable. In such embodiments, decreasing one or more thresholds may increase the sensitivity of the DNS request analysis engine, thereby decreasing the possibility of generating false negatives. As a result, a larger number of malicious DNS requests may be considered suspicious. At the same time, decreasing one or more thresholds increases the possibility of generating false positives, where some number of legitimate DNS requests may be considered suspicious. Likewise, increasing one or more thresholds may decrease the sensitivity of the DNS request analysis engine, thereby increasing the possibility of generating false negatives. As a result, a smaller number of malicious DNS requests may be considered suspicious. At the same time, increasing one or more thresholds decreases the possibility of generating false positives, with the result that a smaller number of legitimate DNS requests may be considered suspicious.

At step 406, the DNS request analysis engine optionally analyzes certain additional characteristics of the DNS request. More specifically, the DNS request analysis engine analyzes the age of the destination domain specified by the hostname within the DNS request. The DNS request analysis engine may determine the age of the destination via any technically feasible approach, such as querying a registration database that includes registration information related to the destination domain or performing a "whois" domain lookup to retrieve registration information related to the destination domain. A domain that has been registered relatively recently, thereby having a young age, may be indicative of a domain associated with a malicious user. Further, the DNS request analysis engine analyzes the characteristics of the domain specified by the current DNS request against other domains that have been marked as suspicious. A domain that shares characteristics with other suspicious domains, such as employing the same authoritative nameserver, may be indicative of a domain associated with a malicious user.

At step 408, the DNS request analysis engine determines whether the domain name associated with the DNS request is considered suspicious, based on one or more characteristics as described in conjunction with steps 404 and 406. If the DNS request is not considered suspicious, then the method 400 proceeds to step 402, described above.

If, at step 408, the DNS request is considered suspicious, then the method 400 proceeds to step 410, where the DNS request analysis engine searches the suspicious domain cache for an entry that includes the domain name associated with the suspicious DNS request. At step 412, the DNS request analysis engine determines whether an entry that includes the domain name associated with the DNS request has been found in the suspicious domain cache. If an entry has been found, then the method 400 proceeds to step 416, where the DNS request analysis engine retrieves the last DNS request associated with the suspicious domain name. At step 418, the DNS request analysis engine replaces the last DNS request field in the entry with the current DNS request. In this manner, each entry in the suspicious domain cache includes the most recent DNS request directed to the suspicious domain.

In some embodiments, the DNS request analysis engine may add the current DNS request to a list of the most recent DNS requests associated with the domain name. In such embodiments, the DNS request with the most recent time stamp may be considered to be the last DNS request for the domain name. The DNS request analysis engine may be periodically save the list of the most recent DNS requests in a log file or other suitable data store for subsequent historical analysis. After the DNS request analysis engine saves the list of the most recent DNS requests in the log file, the DNS request analysis engine may purge the list of the most recent DNS requests from the suspicious domain cache to make room for storing additional incoming DNS requests associated with the domain name.

At step 420, the DNS request analysis engine computes a distance between the current DNS request and the last DNS request directed to the suspicious domain, retrieved in step 416. The DNS request analysis engine may use any technically feasible approach to compute the distance. The distance can be any technically feasible measure of the difference between two FQDNs, including, without limitation, a string distance. A relatively large distance is indicative of a malicious DNS request, because the FQDN for two successive requests may include different labels encoded with different sensitive data. A relatively small distance is indicative of a legitimate DNS request.

At step 422, the DNS request analysis engine compares the distance computed in step 420 against a distance threshold. In some embodiments, the distance threshold may be adjustable. In such embodiments, decreasing the distance threshold may increase the sensitivity of the DNS request analysis engine, thereby decreasing the likelihood of false negatives and increasing the likelihood of false positives. Likewise, increasing the distance threshold may decrease the sensitivity of the DNS request analysis engine, thereby increasing the likelihood of false negatives and decreasing the likelihood of false positives. If, at step 422, the computed distance exceeds the distance threshold, then the method proceeds to step 424, where the DNS request analysis engine increments the count field of the corresponding entry in the suspicious domain queue.

At step 426, the DNS request analysis engine determines whether the count field of the corresponding entry in the suspicious domain queue exceeds a count threshold. In some embodiments, the count threshold may be adjustable. In such embodiments, decreasing the count threshold may cause a suspicious domain to be blocked sooner and, correspondingly, may result in some legitimate domains being blocked. Likewise, increasing the count threshold may cause a suspicious domain to be blocked later, resulting in additional data compromise, and, correspondingly, may result in fewer legitimate domains being blocked. If, at step 426, the count field of the corresponding entry in the suspicious domain queue exceeds the count threshold, then the method 400 proceeds to step 428, where the DNS request analysis engine identifies the suspicious domain as potentially engaging in DNS exfiltration. The DNS request analysis engine blocks further DNS traffic with the suspicious domain.

At step 430, the DNS request analysis engine adds the current DNS request as an entry in the suspicious in-flight cache. At step 432, the DNS request analysis engine receives a responsive DNS message from the domain. At step 434, the DNS request analysis engine searches for an entry in the suspicious in-flight cache for a DNS request with a message identifier that matches the message identifier in the responsive DNS message. If the message identifier in the responsive DNS message does not match any message identifier currently in the suspicious in-flight cache, then the method 400 proceeds to step 432, described above. If the message identifier in the responsive DNS message does match a message identifier currently in the suspicious in-flight cache, then the method 400 proceeds to step 438, where the DNS request analysis engine increments one or more counts of relevant resource records based on the contents of the responsive DNS message. Certain resource records, if included in the responsive DNS message, are indicative of possible DNS tunneling. Such resource records include, without limitation CNAME, MX, and TXT resource records. If any one or more of the relevant resource records are included in the responsive DNS message, the DNS request analysis engine increments the corresponding counts in the entry for the suspicious domain cache.

At step 440, the DNS request analysis engine compares the counts of the relevant resource records against corresponding count thresholds. In some embodiments, and one or more of the resource record count thresholds may be adjustable. In such embodiments, decreasing one or more of the resource count thresholds may cause a suspicious domain to be blocked sooner and, correspondingly, may result in some legitimate domains being blocked. Likewise, increasing one or more of the resource count thresholds may cause a suspicious domain to be blocked later, resulting in additional compromise, and, correspondingly, may result in fewer legitimate domains being blocked. If, at step 440, none of the resource count thresholds is exceeded, then the method proceeds to step 402, described above.

If, at step 440, one or more of the resource count thresholds are exceeded, then, the method proceeds to step 442, where the DNS request analysis engine identifies the suspicious domain as potentially engaging in DNS tunneling. The DNS request analysis engine blocks further DNS traffic with the suspicious domain. The method 400 then returns to step 402, described above. As a result, the DNS request analysis engine continually analyzes incoming DNS requests for suspicious activity.

Returning to step 426, if the count field of the corresponding entry in the suspicious domain queue does not exceed the count threshold, then the method proceeds to step 430, described above.

Returning to step 422, if the computed distance does not exceed the distance threshold, then the method proceeds to step 430, described above.

Returning to step 412, if an entry that includes the domain name associated with the DNS request has not been found in the suspicious domain cache, then the method 400 proceeds to step 414, where the DNS request analysis engine creates a new cache entry in the suspicious domain cache. The DNS request analysis engine initializes the new cache entry to include the suspicious domain name, the DNS request itself, and the IP address corresponding to the domain name. Further, the DNS request analysis engine initializes a count field in the new cache entry to 1, indicating that no DNS requests associated with the suspicious domain name were previously detected. The new cache entry also includes fields for counts of relevant resource records for the purpose of tracking DNS tunneling via DNS messages sent in response to DNS requests. These fields are initialized to 0. The method then proceeds to step 430, described above.

In sum, a DNS request analysis engine is configured to detect and mitigate DNS-based attacks, such as DNS exfiltration and DNS tunneling. The DNS request analysis engine analyzes incoming DNS requests for various characteristics, including the total length of the FQDN included in the DNS request, the number of labels included in the FQDN, and the length of the labels. The DNS request analysis engine also analyzes certain characteristics of the domain name associated with the DNS request, such as the age of the domain name and whether the domain name shares certain attributes with other suspicious domain names. If the DNS request analysis engine determines that a DNS request is suspicious, based on the characteristics of the DNS request and the associated domain name, then the DNS request analysis engine stores the DNS request and related information in a suspicious domain cache. The DNS request analysis engine computes the distance between FQDNs of successive DNS requests to suspicious domains. The DNS request analysis engine counts the number of times the computed distance exceeds a distance threshold. If the count exceeds a count threshold, then the DNS request analysis engine identifies the domain as potentially engaging in DNS exfiltration and blocks further traffic with the domain.

In addition, the DNS request analysis engine stores the DNS request and related information in a suspicious in-flight cache. If and when a DNS message is received in response to the DNS request, the DNS request analysis engine analyzes the response DNS message to search for the presence of certain resource records associated with DNS tunneling. If the DNS request analysis engine receives a certain number of responsive DNS messages from a particular domain that contains such recourse records, then the DNS request analysis engine identifies the domain as potentially engaging in DNS tunneling and blocks further traffic with the domain.

At least one advantage of the disclosed techniques is that a DNS-based attack can be detected and mitigated before a significant amount of data has been exfiltrated or before a significant amount of DNS tunneling has occurred. As a result, target enterprise networks incur little or no data compromise and/or data loss relative to prior approaches. Another advantage of the disclosed techniques is that a DNS domain identified as being associated with a malicious user can be shared with multiple enterprise networks, such as enterprise networks that share the same exfiltration and tunneling mitigation platform. Once a DNS domain is thus identified, DNS requests directed to the DNS domain are blocked from multiple enterprise networks. As a result, further attacks by the malicious user on other enterprise networks may be prevented.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for managing a domain name system (DNS) based attack, the method comprising:
   receiving a first DNS request directed to a first domain name;
   determining that a first characteristic associated with a first fully qualified domain name (FQDN) included in the first DNS request exceeds a first threshold value;
   in response, computing a distance between the first FQDN and a second FQDN included in a second DNS request also directed to the first domain name; and
   incrementing a first count value associated with the first domain name based on the distance.

2. The computer-implemented method of claim 1, further comprising:
   determining that the first count value exceeds a second threshold value; and
   in response, identifying the first domain name as potentially engaging in DNS exfiltration.

3. The computer-implemented method of claim 2, further comprising blocking further DNS traffic to a domain associated with the first domain name.

4. The computer-implemented method of claim 1, further comprising:
   receiving a first DNS message in response to the first DNS request;
   determining that the first DNS message includes a resource record of a first type; and
   in response, incrementing a second count value associated with the first domain name.

5. The computer-implemented method of claim 4, wherein the first type comprises at least one of a CNAME type, an MX type, and a TXT type.

6. The computer-implemented method of claim 4, further comprising:
   determining that the second count value exceeds a second threshold value; and
   in response, identifying the first domain name as potentially engaging in DNS tunneling.

7. The computer-implemented method of claim 6, further comprising blocking further DNS traffic to a domain associated with the first domain name.

8. A non-transitory computer-readable storage medium including instructions that, when executed by a processor, cause the processor to manage a domain name system (DNS) based attack, by performing the steps of:
   receiving a first DNS request directed to a first domain name;
   determining that a first characteristic associated with a first fully qualified domain name (FQDN) included in the first DNS request exceeds a first threshold value;
   in response, computing a distance between the first FQDN and a second FQDN included in a second DNS request also directed to the first domain name; and
   incrementing a first count value associated with the first domain name based on the distance.

9. The non-transitory computer-readable storage medium of claim 8, further comprising:
   determining that the first count value exceeds a second threshold value; and
   in response, identifying the first domain name as potentially engaging in DNS exfiltration.

10. The non-transitory computer-readable storage medium of claim 9, further comprising blocking further DNS traffic to a domain associated with the first domain name.

11. The non-transitory computer-readable storage medium of claim 8, further comprising:
    receiving a first DNS message in response to the first DNS request;
    determining that the first DNS message includes a resource record of a first type; and
    in response, incrementing a second count value associated with the first domain name.

12. The non-transitory computer-readable storage medium of claim 11, further comprising:
   determining that the second count value exceeds a second threshold value; and
   in response, identifying the first domain name as potentially engaging in DNS tunneling.

13. The non-transitory computer-readable storage medium of claim 12, further comprising blocking further DNS traffic to a domain associated with the first domain name.

14. The non-transitory computer-readable storage medium of claim 8, wherein the first characteristic comprises at least one of a length of a first label included in the first DNS request, a length of the first DNS request, and a number of labels included in the first DNS request.

15. The non-transitory computer-readable storage medium of claim 8, further comprising identifying an age associated with the first domain name, wherein computing the distance between the first FQDN and a second FQDN is further in response to determining that the age is less than a second threshold value.

16. The non-transitory computer-readable storage medium of claim 8, further comprising identifying a first nameserver employed by a first domain associated with the first domain name, wherein computing the distance between the first FQDN and a second FQDN is further in response to determining that a second domain associated with a second domain name also employs the first nameserver.

17. A computing device, comprising:
   a memory that includes a recursive domain name system (DNS) resolver and a DNS query analysis engine; and
   a processor that is coupled to the memory,
   wherein, when the processor executes the DNS resolver, the processor is configured to:
      receive a first DNS request directed to a first domain name, and
      transmit the first DNS request to the DNS query analysis engine; and
   wherein, when the processor executes the DNS query analysis engine, the processor is configured to:
      determine that a first characteristic associated with a first fully qualified domain name (FQDN) included in the first DNS request exceeds a first threshold value;
      in response, compute a distance between the first FQDN and a second FQDN included in a second DNS request also directed to the first domain name; and
      increment a first count value associated with the first domain name based on the distance.

18. The computing device of claim 17, wherein, when the processor executes the DNS query analysis engine, the processor is further configured to:
   determine that the first count value exceeds a second threshold value; and
   in response, identify the first domain name as potentially engaging in DNS exfiltration.

19. The computing device of claim 17, wherein, when the processor executes the DNS query analysis engine, the processor is further configured to:
   receive a first DNS message in response to the first DNS request;
   determine that the first DNS message includes a resource record of a first type; and
   in response, increment a second count value associated with the first domain name.

20. The computing device of claim 19, wherein, when the processor executes the DNS query analysis engine, the processor is further configured to:
   determine that the second count value exceeds a second threshold value; and
   in response, identify the first domain name as potentially engaging in DNS tunneling.

* * * * *